C. K. LASSITER.
MACHINE FOR THREADING AND TURNING BOLT BLANKS.
APPLICATION FILED JAN. 24, 1906.

913,520.

Patented Feb. 23, 1909.
5 SHEETS—SHEET 1.

UNITED STATES PATENT OFFICE.

COLUMBUS K. LASSITER, OF SCHENECTADY, NEW YORK.

MACHINE FOR THREADING AND TURNING BOLT-BLANKS.

No. 913,520.  Specification of Letters Patent.  Patented Feb. 23, 1909.

Application filed January 24, 1906. Serial No. 297,651.

*To all whom it may concern:*

Be it known that I, COLUMBUS K. LASSITER, a citizen of the United States of America, residing at Schenectady, in the county of Schenectady and State of New York, have invented new and useful Improvements in Machines for Threading and Turning Bolt-Blanks, of which the following is a specification.

This invention relates to a machine for threading and turning bolt blanks, and particularly for forming stay-bolts having threaded terminals and intermediately concaved or reduced portions, although the apparatus may be employed for simultaneously threading and shaping other kinds of bolts.

The object of the invention is to provide a machine whereby the bolts may be rapidly threaded and shaped in a single operation, and wherein provision is made for automatically throwing the threading and cutting devices into and out of action.

A further object of the invention is to provide interchangeable means whereby the bodies of the blanks may be given any desired reducing shape or contour, and whereby one or more bolts may be made from a single blank.

A still further object is to provide simple and effective gaging means by which the reducing cutters may be adjusted to cut any desired depth into the blanks.

Another object is the production of a novel construction of threading and cutting mechanism by which the parts are steadied while in action to form perfect threads, and which affords an accurate operation of the working parts and their convenient adjustment to suit different conditions of work.

The invention consists of the novel features of construction, combination and arrangement of parts hereinafter described and claimed, reference being had to the accompanying drawing, forming a part of this specification, and in which,—

Referring now more particularly to the drawings, the numeral 1 designates a base of suitable dimensions, on which is supported a bed 2 having a chamber 3 opening through the bottom thereof for convenience in assembling the adjacently disposed parts of the operating mechanism hereinafter described. The bed carries an oil receiving hopper or receptacle 4, having an outlet pipe 5 leading downwardly therefrom to a lower oil tank 6. Rising from opposite portions of the bed are uprights 7, supporting at their upper ends an oil distributing tank 8, from which an oil supply pipe 9 leads to a pump 10 of suitable construction. The piston rod 11 of this pump is jointed to the arm 12 of an eccentric 13 on a stub shaft 14 supported by a bracket 15 on one end of the bed 2, the said shaft also having fixed thereto a driving pulley 16 connected by a belt 17 with a pulley 18 on a drive shaft 19 carrying belt pulleys 20 for connection with a belt leading from a suitable line shaft. The shaft 19 has bearing in a standard 21 and in a portion of the base 1 and in a hanger 22 fixed to said base.

Depending from the oil distributing tank 8, and extending into the oil receiving hopper 4, is an overflow pipe 23, which projects upwardly into the tank 8 and terminates above the top thereof to prevent the oil pumped thereinto through the pipe 9 from rising above a determined level. The oil feeds from the distributing tank through a depending feed pipe 24 provided with a controlling valve 25, and flows through the tool carriage in the manner hereinafter described into the hopper 4 and thence through the overflow pipe 5 into the tank 6, from which it is drawn through a pipe 26 to the pump, thus providing for a continuous circulation and reuse of the oil in the operation of the machine.

Rising from the bed, between the uprights 7 and attached to the bottom of the oil distributing tank 8, is a pair of guide rods 27 on which is slidably mounted a tool-holding carriage 28. Fixed to the carriage and extending upwardly through the bottom of the tank 8 are operating rods 29 connected at their upper ends by a cross head 30 having attached thereto one end of a carriage controlling belt 31. This belt passes upwardly over and extends downwardly from a pulley 32 on a line shaft 33 and is provided at its free end with an operating handle 34. The shaft 32 is continually rotated while the belt 31 is normally in slack engagement with the band wheel 32, whereby when the operator draws downward upon and brings the belt into engagement with said wheel power will be applied to elevate the carriage 28. The weight of the carriage and that of the tools carried thereby is sufficient to effect the downward feed of the same by gravity, in which feed or movement the cutting and threading tools operate upon the bolt blank, the action of the threading tools on the blank regulating the movement of the carriage at a proper prescribed speed.

On the inner end of the shaft 19 is a beveled pinion 35 which meshes with a beveled gear wheel 36 on the lower end of a spindle 37 journaled in a bearing sleeve 38 fixed to the bed and carrying at its upper end a work supporting head or holder 39 having a socket 40 to receive an angular lug or projection 41 formed on the lower end of the bolt blank 42, which is thereby supported and rotated in the operation of the machine. The carriage 28 comprises a body of suitable form having diagonally opposed guide members 43 which fit and slide on the guide rods 27, and is provided with a vertical bore or passage 44 for the reception of the bolt blank on the downward and upward movement of the carriage, whereby the carriage is adapted to travel along the blank. A cup 45 is provided with a tubular stem 46 to fit within the upper portion of the bore, and is adapted in the operation of the carriage to catch the oil feeding from the pipe 24 and guide the same into the bore, whence it flows downward along the bolt blank and into contact with the cutting and threading tools to lubricate the same, and thence discharges into the hopper 4 for a repeated feed in the manner previously described. A head 47 of cylindrical form is arranged upon the underside of the body and provided with an upwardly extending tubular shank 48 occupying the bore 44 below the cup and fixed to the body by fastening screws 49. The head is thus held from movement on the body, and is provided in its lower portion with radial slots 50 receiving radially movable blocks 51 having tongues or projections 52 movable in guideways 53 communicating with said slots, the blocks thus being radially adjustable toward and from the bore of the head which alines with the bore of the carriage body. Each block is slotted to receive a threading die 54 detachably fastened thereto by a screw 55, and is also formed with a radial opening 56 closed at its outer end by a screw plug 57 and communicating at its inner end with a slot 58 into which projects a screw 59 extending from the head. A coiled spring 60, arranged within the opening 56, is interposed between the screws 57 and 59 and exerts its expansive energy to force the block 51 outwardly and to thereby retract the threading die.

Arranged to turn upon the head 47 is a ring 61 held from upward movement by the carriage body and a retaining ring or rim flange 62 fastened to the lower end of the ring by screws 63, which retaining ring 62 also prevents the entrance of foreign particles into the spaces between the cam surfaces of the parts hereinafter described. Formed in the periphery of the body is an annular groove 64 receiving diametrically disposed projections 65 fixed to the body and projections 66 carried by screws 67 mounted on the ring 61. A pair of coiled springs 68 is seated in the groove 64, and each spring bears at one end upon one of the projections 65 and at its opposite end against one of the projections 66, said springs being arranged to turn the ring 61 a prescribed extent in one direction. The ring 61 is formed with cam surfaces 69 to engage corresponding surfaces 70 on the die carrier blocks 51, whereby the dies are adapted to be adjusted in and out, the arrangement being such that the cam surfaces contact when the ring 61 is turned to compress the springs 68 to force the dies outward against the resistance of their retracting springs 60, while a reverse movement of the ring under the expansion of the springs will throw the cam surfaces out of contact and permit the dies to be retracted by the said springs 60.

Figures 1, 20:
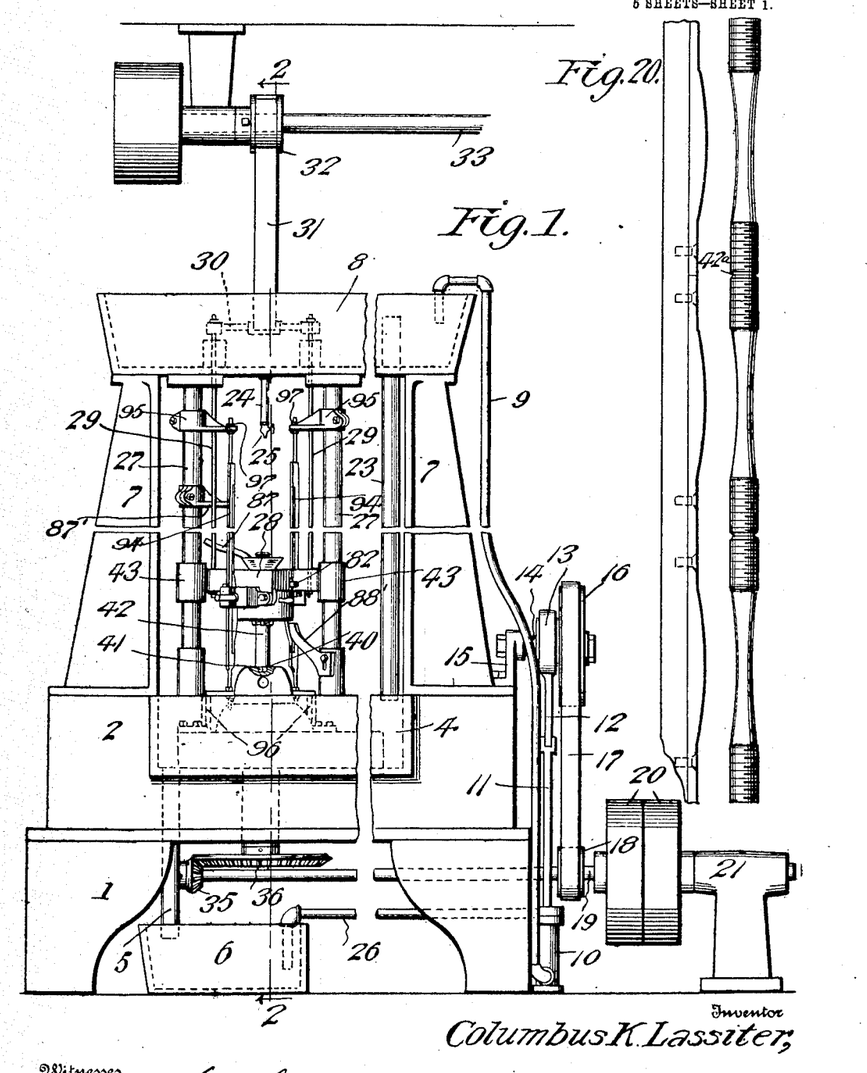
Figure 1 is a front elevation of a machine embodying the invention, a part of the frame structure being broken away.
Fig. 20 is an elevational view of a controller embodying a plurality of cams for shaping a number of bolts formed from a single blank, and also showing the completed blank as it appears prior to its separation into a plurality of bolts.
Figures 5, 6, 7:
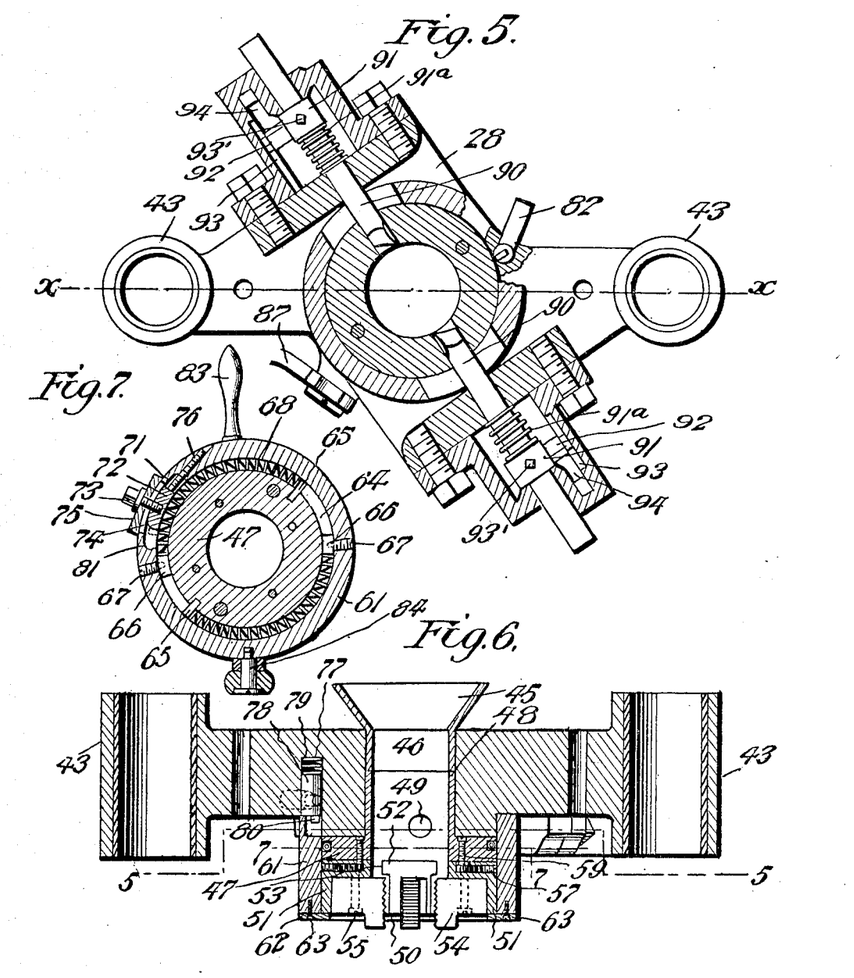
Fig. 5 is an inverted horizontal section taken on line 5—5 of Fig. 6.
Fig. 6 is a vertical longitudinal section taken on line 6—6 of Fig. 3.
Fig. 7 is a horizontal section on line 7—7 of Fig. 6.
Figures 8, 9, 10, 11, 12, 13:
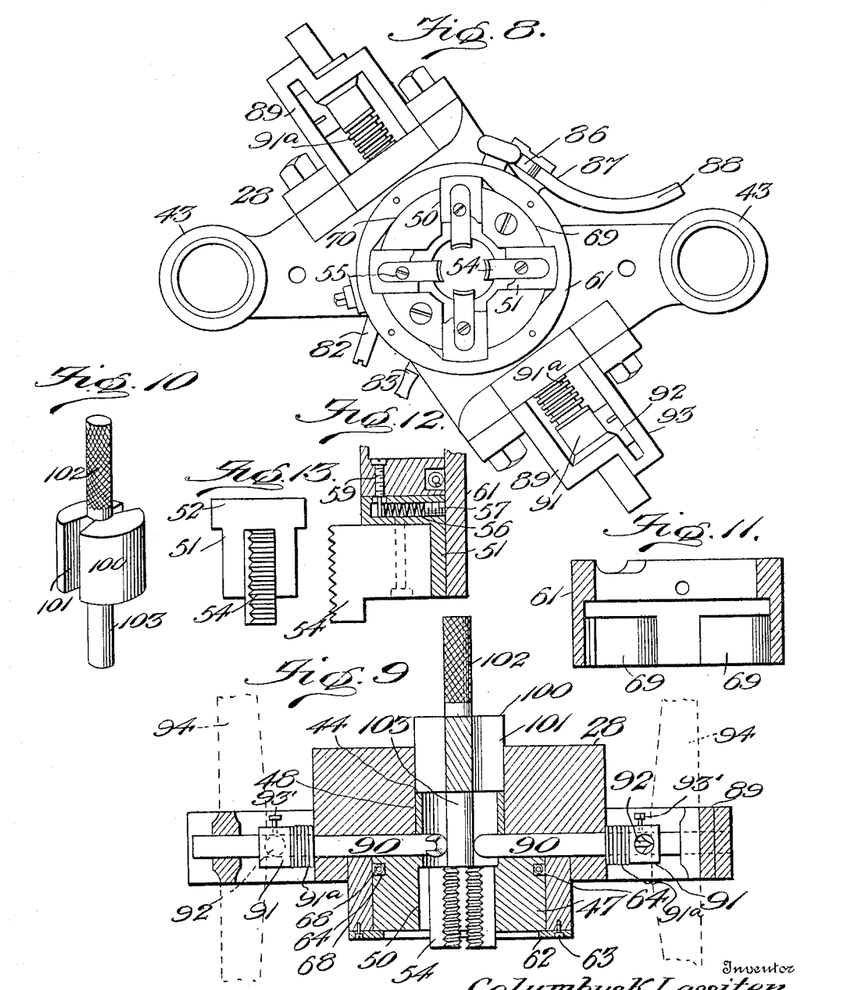
Fig. 8 is a view similar to Fig. 4 with the retaining ring omitted to show the cam construction.
Fig. 9 is a vertical longitudinal section on line 9—9 of Fig. 3, illustrating the mode of using the cutter-setting gage and adjusting the cutters thereby.
Fig. 10 is a detail view of the cutter-setting gage.
Fig. 11 is a sectional view of the cam ring.
Fig. 12 is a section on a larger scale of parts shown in Fig. 6.
Fig. 13 is a detail of one of the threading dies.

The ring 61 is provided at one side with a guide groove 71 in which is slidably mounted a block 72, adapted to be fixed in adjusted position therein by a screw 73 movable in a slot 74 and having a head to bear upon a clamping plate 75 to frictionally engage the outer side of the ring and hold the block in adjusted position. The block 72 is of a length corresponding approximately to one-half the length of the groove 71 and is engaged at one end by an adjusting screw 76 accessible from the exterior and projecting at an angle into one end of said groove. The block 72 serves as an adjustable gage and stop whereby the throw of the cam ring 61, and consequently the extent of inward and outward adjustment of the threading dies may be regulated, so that the normal position of the dies may be changed to over or underthread bolt blanks of a given size, or, in other words, to vary the depth of the threads as occasion may require. The groove 71 is adapted to communicate with a socket 77 in the carriage body, in which socket operates a plunger 78 normally projected or pressed downward by a spring 79 and carrying at its lower end a locking lug or projection 80 adapted to enter the space 81 between the block 72 and the groove 71 at the end opposite that into which the screw 76 projects. An actuating pin 82 is attached to the plunger 79 and projects outwardly from the carriage, as shown in Figs. 1, 5 and 8, and plays vertically in a slot in the side of the carriage communicating with the socket 77. The locking plunger is so arranged as to be brought into coincidence with the space 81 when the ring 61 is turned against the resistance of the springs 68 to project the dies, so that the lug 80 will snap into the space 81 and lock the ring and dies in projected position. The lug 80 abuts against the rear end of the block 72 in the direction of turning movement of the ring 61 to effect the closure of the dies, and it will thus be understood that the extent of such throw or movement of the ring will be controlled by the position of the block 72. At a point adjacent the pin 82 the cam ring is provided with a fixed handle 83 to enable it to be manually operated in testing the action and whenever it is found necessary to rapidly move the dies back and forth to dislodge any foreign particles interfering with their operation. A stud 84 projects from the side of the ring diametrically opposite the handle 83 and carries a friction roller 85. This roller 85 is adapted to be engaged by the arm 86 of a bell crank die closing lever 87, the other arm 88 of which projects outwardly from the carriage into the path of an actuating bracket or contact device 87' carried by one of the guides 27, by which when the carriage reaches the limit of its upward movement the lever will be rocked to throw the arm 86 into engagement with the roller 85 and turn the ring 61 against the resistance of the springs 68 to project the dies. The pin 82 is adapted when the carriage reaches the limit of its downward movement to contact with a contact device releasing arm or bracket 88' arranged on the other guide 27, so that at the completion of the threading operation the locking device will be retracted to allow the springs 68 and 60 to respectively and consecutively retract the cam ring and dies. The parts 87' and 88' may be adjustably mounted in any preferred manner so as to be positioned to act with the best effect upon the parts to be operated thereby.

Figures 2, 14, 15, 16, 17, 18:
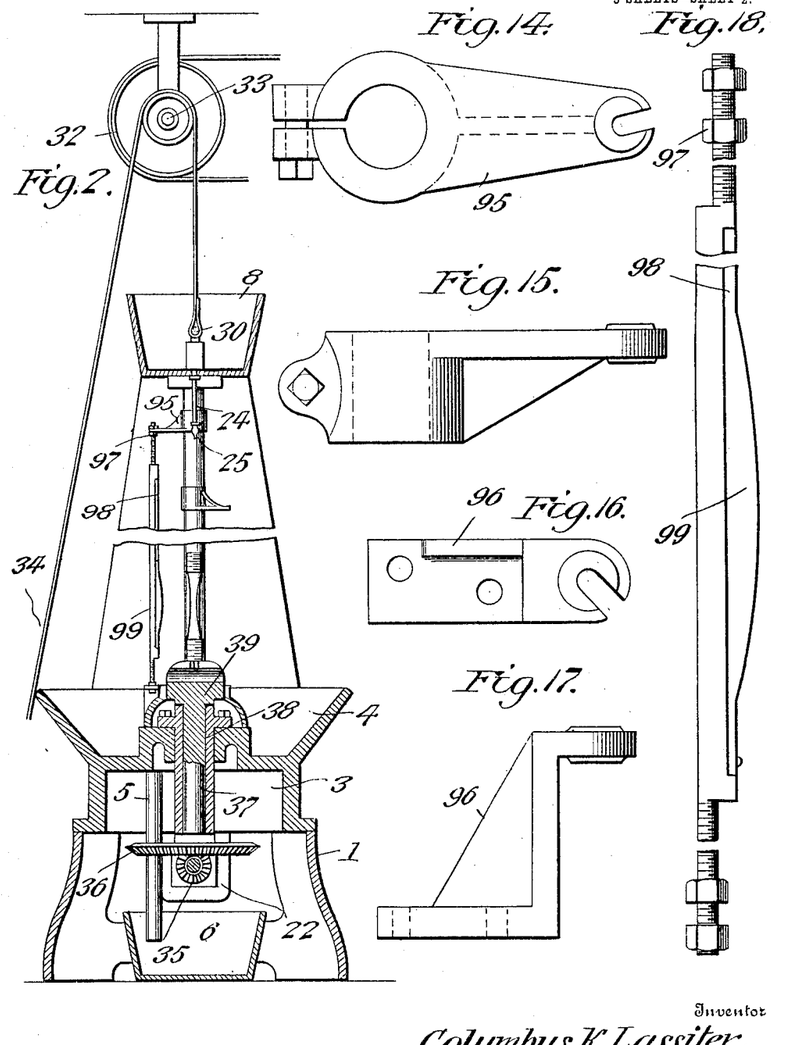
Fig. 2 is a vertical transverse section through the machine on line 2—2 of Fig. 1, the tool-carriage being omitted.
Fig. 14 is a plan view of one of the upper controller supporting brackets.
Fig. 15 is a side view thereof.
Fig. 16 is a plan view of one of the lower controller supporting brackets.
Fig. 17 is a side view thereof.
Fig. 18 is a side elevation of one of the controllers.
Figures 3, 4, 19:
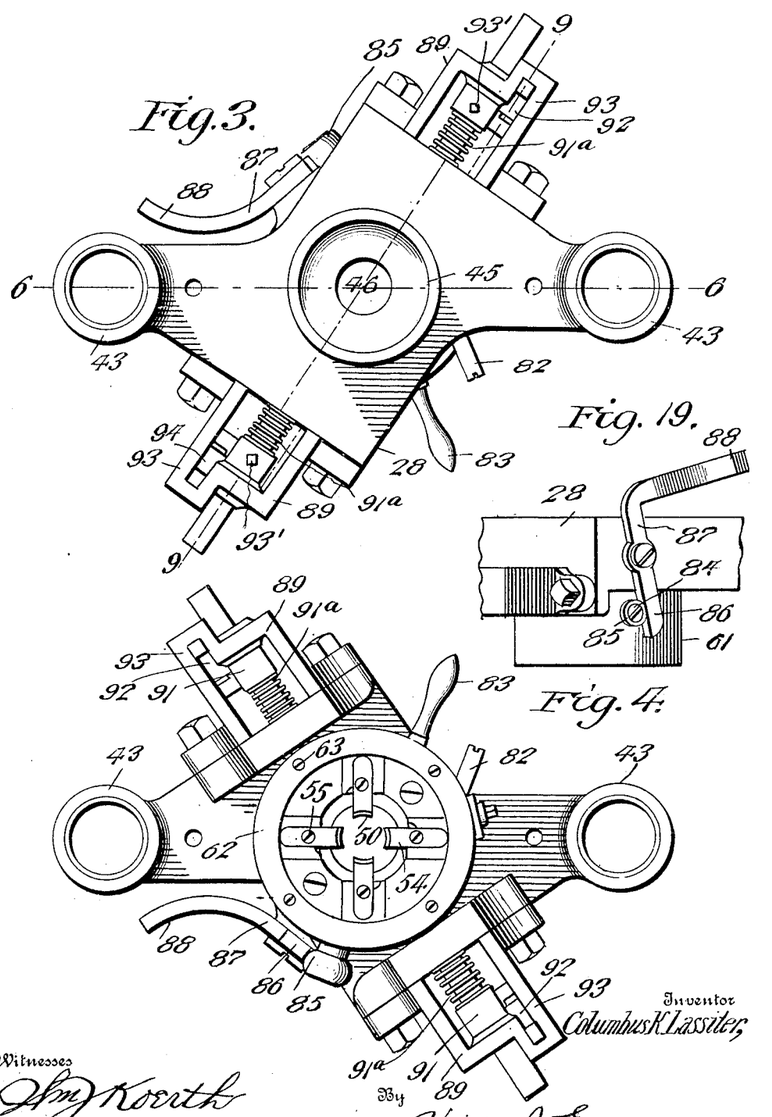
Fig. 3 is a top plan view of the cutter head or tool carriage.
Fig. 4 is a bottom plan view of the same.
Fig. 19 is a detail view of the trip mechanism for projecting the threading dies.

Fixed to opposite sides of the carriage are open or vertically slotted guide brackets 89, and slidably mounted in the body radially with respect to the bore thereof and disposed in rear of the threading dies in the direction of working movement of the carriage are diametrically disposed cutting tools 90 having inner cutting ends to concave or reduce the body of the bolt blank. The outer ends of the cutting tools are slidably mounted in the brackets 89 and provided with heads 91 having laterally extending lugs 92 movable in guides 93 formed in the brackets, a spring 91$^a$ being arranged to surround the tool shank between the head 91 and carriage body to slide the tools outwardly. Each head 91 is adjustably fastened upon the tool through the medium of a set screw 93'. The cutting tools are controlled in action by controlling devices 94, one for each tool, said devices comprising bars detachably mounted at their upper and lower ends in brackets 95 and 96, respectively, having slots to receive the ends of the rods, which are suitably reduced to fit therein, and are confined in position by fastening nuts 97. Each controller bar or rod is formed with a recessed face to receive a single strip or a plurality of strips, as respectively shown in Figs. 18 and 20, each strip having a cam enlargement 99 corresponding in contour to the shape of the concavity to be formed in the bolt blank. The strips are detachably fastened by screws or other fastening means so as to render them interchangeable in order that the controllers may be set to concave the body of a blank adapted to form a single bolt or the portions of a blank designed to form a plurality of bolts. The carriage will have, in practice, a range of motion for forming stay-bolts of the greatest length in use, so that when it is desired to form a plurality of bolts from a blank of such length the controllers may be adapted for projecting the cutters a plurality of times by attaching thereto one or more strips having the required number of cam surfaces.

In the operation of the machine, a bolt blank 42 is connected with the rotating head 39 by seating the lug 41 upon its lower end into the recess 40, and the carriage with the cutting dies projected allowed to descend. On such downward movement of the carriage the threading dies continuously thread the rotating bolt blank along its entire length. When the heads on the shanks of the cutting tools come in contact with the cam enlargements 99 of the controllers, said tools will be projected to reduce or concave the body of the blank a distance corresponding to the length of the cam enlargements. The cutters will thus operate between the initial and final actions of the threading dies and will follow in rear of the same to strip the threads formed thereby from the intermediate portion of the blank. When the heads on the cutting tools pass the lower ends of the cam enlargements 99, said tools will be retracted by their springs 91ª, while the dies will continue to operate until the blank is threaded to its lower end, when the pin 82 will be engaged by the arm 88′, and the locking device thereby retracted to release the cam ring and permit the same to swing to normal position and the dies to open and release the bolt blank, which may then be removed. Upon the elevation of the carriage the arm 88 of the bell crank lever will be engaged by the bracket 87′, whereby the dies will be projected for engagement with the succeeding bolt blank upon the ensuing downward movement of the carriage and the cam ring will be locked in its die-projecting position for a repetition of the operation above described. As a result of this mode of manufacture, a stay-bolt is produced which is terminally threaded and intermediately concaved or reduced in a single operation and in such manner as to preserve the lead of the threads. A large number of bolts may, therefore, be produced within a given length of time, thus simplifying the operation of lessening the cost of production. It will be understood, of course, that when a plurality of bolts are to be formed from a single bolt blank, the controller bars will be provided with the required number of cam enlargements, and that the detachable connection of the strips 98 with the controller bars permits this to be easily accomplished. In this case the bolt blank will preferably be provided with notched or reduced portions 42ª separating it into bolt sections of the desired length and adapting said sections to be conveniently snapped or cut apart.

The adjustable connection of the heads 91 of the cutting tools 90 with the shanks of said tools enables the tools to be set to have a throw or projection corresponding to the greatest extent of projection of the cam enlargements 99 by which they are to be operated to regulate their cutting action on the body of the blank. In order to regulate the throw of the cutting devices, a gage 100 of the construction shown in Figs. 9 and 10 is provided whereby such devices may be adjusted or set to cut to the desired depth into the body of the blank. This gaging device is in the form of a cylindrical body or plug of a size to fit snugly within the upper portion of the carriage bore 44 normally occupied by the shank of the cup 45 and is provided in its opposite sides with peep holes or passages 101. Projecting from the upper end of the plug is a serrated finger stem or handle 102 and from the lower end thereof a gage stem 103. To set the cutters for proper action, the carriage is adjusted until the heads 91 engage the highest points of the cam enlargements 95, the cup 45 is removed and the gage plug inserted in position, as shown in Fig. 9, the set screws 93′ having previously been loosened to permit the heads 91 to slide inward on the shanks of the cutters 90, after which the screws are tightened to fix the heads in adjusted position. The operator may determine when the cutters are properly set by looking downward through the peep holes 101. The stem 103 is of a proper diameter to determine the extent of reduction, so that when the cutting tools are adjusted to bring their cutting ends into engagement with said stem, the proper set of the cutting tools will be secured.

It will be seen that the construction of the machine not only provides for the rapid manufacture of stay-bolts of this character, but automatically throws the dies into and out of action at the beginning and completion of the operation and adapts the threading dies to be conveniently adjusted for over and underthreading.

Having thus described the invention, what is claimed as new, is:—

1. In a bolt making machine, the combination of a frame provided with a vertical guideway, a rotary bolt-blank holder located at the lower end of the vertical guideway, a carriage arranged to traverse the guideway and provided with an opening for the reception of the bolt-blank, a collapsible die on the carriage comprising spring-retracted elements movable radially toward and from said opening, a spring-retracted rotary cam on the carriage controlling the dies, an operating device on the carriage for engaging and turning the cam to die-projecting position, a locking device on the carriage for engaging and holding the cam in die-projecting position, a contact device on the frame at or near the limit of upward movement of the carriage for actuating said operating device, and a contact device on the frame at or near the limit of the downward movement of the carriage for engaging and retracting the locking device.

2. In a bolt making machine, the combination of a frame, a rotary bolt holder supported thereby, a carriage movable toward and from the bolt holder, a collapsible die on the carriage comprising a series of radially movable die members, springs for retracting the same, a rotary cam supported on the carriage and having a contact member thereon and adapted to be turned to project the dies, an adjustable keeper thereon, spring means for retracting the cam, a locking device on the carriage adapted to engage the keeper when said cam is turned to hold the cam in die-closing position, a lever pivotally mounted on the carriage and adapted to be operated to engage said contact member and turn the cam to die-closing position, a contact device on the frame operative on the upward movement of the carriage to actuate said lever, and a contact device on the frame operative on the downward movement of the carriage to retract the locking device.

3. In a bolt making machine, the combination of a frame having a vertical guideway, a rotary bolt holder at the lower end of the guideway, a carriage arranged to traverse said guideway for movement toward and from the bolt holder and along the bolt blank rotated thereby, a collapsible die on the carriage comprising spring retracted radially movable die members, an automatically retracted rotary cam for projecting said die members, locking mechanism for holding the cam in projected position, said mechanism including a projection on the carriage for releasing the locking mechanism, a crank lever on the carriage for actuating the cam, and contact devices on the frame at the upper and lower portions of the guideway for respectively actuating the lever to project the cam and moving the said projection of the locking means to release said means and thereby permit retraction of the dies and cam.

4. In a bolt making machine, the combination of a frame, a rotary bolt holder supported thereby, a carriage movable toward and from the bolt holder, a collapsible die on the carriage comprising a series of radially movable die members, springs for retracting the same, a rotary cam supported on the carriage and having a contact member thereon and adapted to be turned to project the dies, spring means for retracting the cam, a locking device on the carriage adapted to engage and hold the cam in die-projecting position, a lever pivotally mounted on the carriage and adapted to be operated to engage said contact member and turn the cam to die-projecting position, a contact device on the frame operative on the upward movement of the carriage to actuate said lever, and a contact device on the frame operative on the downward movement of the carriage to retract the locking device.

5. In a bolt making machine, the combination of a frame, a rotary bolt holder supported thereby, a carriage movable toward and from the bolt holder, a collapsible die on the carriage comprising a series of radially movable die members, springs for retracting the same, a rotary cam supported on the carriage and adapted to be turned to project the dies, spring means for retracting the cam, a locking device on the carriage adapted to engage and hold the cam in die-projecting position, an operating device on the carriage operative to turn the cam to die-projecting position, a contact device on the frame acting on the upward movement of the carriage to engage and actuate said operating device, and a contact device on the frame acting on the downward movement of the carriage to engage and retract the locking device.

6. In a bolt making machine, the combination of a frame provided with a pair of spaced vertical guide bars, a rotary bolt holder supported by the frame between the lower ends of the bars, a carriage slidable vertically toward and from the bolt holder on said guide bars, a collapsible die on the carriage comprising a series of radially movable die members, spring means for retracting the same, a rotary cam supported on the carriage and adapted to be turned to project the dies, said cam having a contact member thereon, spring means for retracting the cam, a locking device on the carriage and adapted to engage and hold the cam in die-projecting position, a bell crank lever pivotally mounted on the carriage and having one of its arms arranged to engage said contact member for movement of the cam to die-projecting position upon the actuation of said lever, a contact device supported by the frame and arranged to lie in the path of the other arm of the bell crank lever to engage and actuate said lever on the upward movement of the carriage, and a contact device on the frame arranged to engage and retract said locking device on the downward movement of the carriage.

7. In a bolt making machine, the combination of a frame provided with spaced vertical guides, a rotary bolt holder supported by the frame between the lower ends of the guides, a carriage freely slidable on said guides for movement toward and from the bolt holder, a collapsible die on the carriage comprising a series of radially movable die members, springs for retracting the same, a rotary cam supported on the carriage and movable in one direction to project the dies, spring means for retracting the cam, a contact member on the cam, a locking device on the carriage adapted to engage and hold the cam in die-projecting position, a bell crank lever pivotally mounted on the carriage and having one of its arms arranged to engage said contact member to turn the cam to die-projecting position upon the actuation of said lever, the locking device and lever being arranged at diametrically opposite sides of the carriage, a contact device upon one of the guides arranged to lie in the path of the other arm of the bell crank lever to engage said arm and actuate the lever to turn the cam to die-projecting position at the limit of upward movement of the carriage, and a contact device upon the other guide arranged to engage and retract the locking device at the limit of downward movement of the carriage.

In testimony whereof, I affix my signature in presence of two witnesses.

COLUMBUS K. LASSITER.

Witnesses:
SADIE F. MILLER,
LAWRENCE B. SMITH.